United States Patent [19]

Gaertner

[11] Patent Number: 4,784,000
[45] Date of Patent: Nov. 15, 1988

[54] MAGNETIC FLOWMETER COIL DRIVER AND METHOD

[75] Inventor: Max H. Gaertner, Warminster, Pa.
[73] Assignee: Emerson Electric Co., St. Louis, Mo.
[21] Appl. No.: 3,591
[22] Filed: Jan. 15, 1987
[51] Int. Cl.⁴ ............................................ G01F 1/60
[52] U.S. Cl. .................................. 73/861.12; 361/154
[58] Field of Search .......... 73/861.12, 861.16, 861.17; 361/152, 153, 154

[56] References Cited

U.S. PATENT DOCUMENTS

| | | | |
|---|---|---|---|
| 4,144,751 | 3/1979 | Yokoyama | 361/154 X |
| 4,204,240 | 5/1980 | Schmoock | 361/152 |
| 4,319,301 | 3/1982 | Hill | 361/154 X |
| 4,462,060 | 7/1984 | Schmoock | 361/154 |
| 4,563,904 | 1/1986 | Geisler et al. | 73/861.12 |

*Primary Examiner*—Charles A. Ruehl
*Attorney, Agent, or Firm*—Polster, Polster and Lucchesi

[57] ABSTRACT

A magnetic flowmeter includes circuitry for applying a first relatively high voltage across the electromagnet coils of the meter for a controlled length of time to build the coil current to a desired level and circuitry for applying a second, relatively low voltage across the electromagnet coils after the application of the high voltage to maintain the coil current at the desired level. The coil current is sampled at predetermined times during the application of the relatively low voltage and the length of time the relatively high voltage is applied is varied to eliminate differences in consecutive coil current samples. The actual level of the coil current is controlled by a magnetic amplifier which includes a saturable reactor. The voltage waveform applied to the electromagnetic coil reverses in polarity each half cycle due to a bridge circuit which is connected to a power supply of a single polarity.

31 Claims, 3 Drawing Sheets

MAGNETIC FLOWMETER COIL DRIVER AND METHOD

BACKGROUND OF THE INVENTION

This invention relates to electromagnetic flowmeters and more particularly to systems for energizing the electromagnetic coils thereof.

In a magnetic flowmeter, a magnetic field across a flowtube generates a voltage in a fluid flowing through the tube. This voltage, which is proportional to the flow rate, is sensed by electrodes and is amplified by a signal processing system to produce an output signal which is proportional to the flow rate.

The magnetic field across the flowtube is generated by electromagnetic coils excited by a driver circuit. Presently known magnetic flowmeters utilize either alternating current or pulsed direct current driver circuits. The advantages and disadvantages of each type of driver circuit are discussed in U.S. Pat. No. 3,783,687 to Mannherz et al and in U.S. Pat. No. 3,965,738 to Watanabe, for example. Although, as pointed out in these patents, a pulsed direct current drive provides numerous advantages, perturbations (spikes) caused by the rise of current in the magnetic coils and fluctations in the "steady state" current degrade the accuracy and precision of the meter. U.S. Pat. No. 4,325,261 to Freund Jr. et al, co-assigned with the present application, addresses some of these concerns.

It has been found that the voltage required to produce the current necessary to excitate the electromagnetic coils, and thus to generate the magnetic field, varies with cable length, the resistance of the electromagnetic coils, and with coil temperature. In addition, this voltage can vary with the particular wire size used in the electromagnet, with manufacturing tolerances, and with differences in eddy current losses. Such variations in voltage reflected in coil current tend to cause drift and other errors in the flowrate sensed by the flowmeter and tend to mask the actual flow signal.

As mentioned above, a DC driver circuit is desirable for use with such magnetic flowmeters, and in particular a squarewave regulated current is particularly desirable. Heretofore, however, such a squarewave driving current has required two voltage supplies, both positive and negative. In addition, such systems, in order to conserve power, have used duty cycle excitation of the coils, which has resulted in a large pulsating component in the flow signal itself. Such duty cycle excitation has been used because with an inductive circuit, such as the coil of an electromagnet, the current never reaches a steady-state value when driven by a fixed voltage drive. The prior art devices have used duty cycle excitation to provide the desired average current through the electromagnet coils. However, this has resulted in undesirable ripple in the coil current which causes the pulsating component in the flow signal referred to above.

SUMMARY OF THE INVENTION

Among the various objects and features of the present invention may be noted a coil driver system which automatically compensates for magnetic flowmeter variations such as cable length, coil inductance, coil resistance, coil temperature, and the like.

Another object of the present invention is the provision of such a system which accurately controls the coil driver current in a magnetic flowmeter.

A third object of the present invention is to provide a simple squarewave power supply which does not require both positive and negative supplies.

Another object of the present invention is the provision of such a system which has high efficiency and substantially eliminates any pulsating component of the flow signal and provides a smooth, non-pulsating current to drive the electromagnet coils of the flowmeter.

Another object of the present invention is to simply and readily provide the desired steady state coil current without pulsing a high voltage source, thereby eliminating ripple.

Other objects and features will be in part apparent and in part pointed out hereinafter.

Briefly, a magnetic flowmeter of the present invention includes a body adapted to be connected in a flow system for flow of liquid therethrough, an electromagnet coil for generating a magnetic field in the path of the fluid flowing through the body, and a voltage source for applying a controlled voltage waveform across the coil to generate the magnetic field. The strength and direction of the magnetic field is a function of the applied voltage waveform. The voltage source includes means for periodically reversing the polarity of the voltage applied across the coil to reverse the direction of the magnetic field. The flowmeter also includes electrodes disposed transverse to the path of the fluid for detecting an induced voltage caused by the flow of the fluid through the magnetic field. The magnitude of the induced voltage is generally proportional to the rate of flow of the fluid. A voltage source includes circuitry for applying a first, relatively high voltage across the coil for a controlled length of time to build the coil current to a desired level and circuitry for applying a second, relatively low voltage across the coil after the application of the high voltage to maintain the coil current at the desired level so that the voltage waveform includes for each cycle half a relatively high voltage portion and a relatively low voltage portion. The flowmeter also includes circuitry for sampling coil current and circuitry responsive to differences in consecutive coil current samples for substantially eliminating such differences in subsequent coil current samples by changing the length of time the relatively high voltage is applied across the coil.

The method of the present invention is directed to driving the coils in a magnetic flowmeter having a body adapted to be connected in a flow system for flow of liquid therethrough and coils for generating a magnetic field in the path of the fluid flowing through the body. The method includes the steps of cyclically applying a relatively high voltage and a relatively low voltage across the coils, and sensing the current through the coils during a portion of the cycle when only the relatively low voltage is being applied across the coils. If the current sensed during the time the relatively low voltage is applied across the coils rises slightly during the time the relatively low voltage is applied, the length of time the relatively high voltage is applied during subsequent cycles is increased. Similarly, when the current sensed during the relatively low voltage portion of the cycle falls slightly during the time the relatively low voltage is applied, the length of time the relatively high voltage is applied during subsequent cycles is decreased.

In another embodiment of the present invention, a magnetic flowmeter includes a body adapted to be connected in a flow system for flow of liquid therethrough, an electromagnetic coil for generating a magnetic field in the path of the fluid flowing through the body, and a voltage source for applying a voltage waveform across the coil to generate the magnetic field. The strength and direction of the magnetic field is a function of the applied voltage waveform. Electrodes are disposed transverse to the path of the fluid for detecting an induced voltage caused by the flow of the fluid through the magnetic field. The magnitude of the induced voltage is generally proportional to the rate of flow of the fluid. The voltage source includes means for applying a first, relatively high voltage across the coil for a controlled length of time to build the coil current to a desired level and circuitry for applying a second, relatively low voltage across the coil after the application of the high voltage to maintain the coil current at the desired level so that the voltage waveform includes a relatively high voltage portion and a relatively low voltage portion for each cycle. Circuitry is included for sensing coil current, and circuitry is also included to make small adjustments to the low voltage supply, for regulating coil current during the low voltage portion of the cycle. The regulating circuitry includes a saturable reactor connected to the low voltage applying source for controlling the voltage applied thereby, the saturable reactor being responsive to the current sensing circuitry.

In yet another embodiment of the present invention, a magnetic flowmeter includes a body adapted to be connected in a flow system for flow of liquid therethrough, and a coil for generating a magnetic field in the path of the fluid flowing through the body. A voltage source applies a voltage waveform across the coil to generate the magnetic field, the strength and direction of the magnetic field being a function of the applied voltage waveform. The voltage source includes circuitry for periodically reversing the polarity of the voltage applied across the coil to reverse the direction of the magnetic field. Electrodes are provided transverse to the path of the fluid for detecting an induced voltage caused by the flow of the fluid through the magnetic field, the magnitude of the induced voltage being generally proportional to the rate of the flow of the fluid. The polarity reversing circuitry includes four electronic switching elements, each having a pair of load current terminals and a control terminal for controlling the flow of current between its associated load current terminals. The load current terminals of the switching elements are connected in a bridge configuration with the coil connected across two, opposite nodes of the bridge. The other two nodes of the bridge are connected to a single polarity voltage source and to a circuit common respectively, through a current sensing element.

BRIEF DESCRIPTION OF THE DRAWINGS

Similar reference characters indicate similar parts throughout the several views of the drawings.

DESCRIPTION OF THE PREFERRED EMBODIMENT

Figure 1:
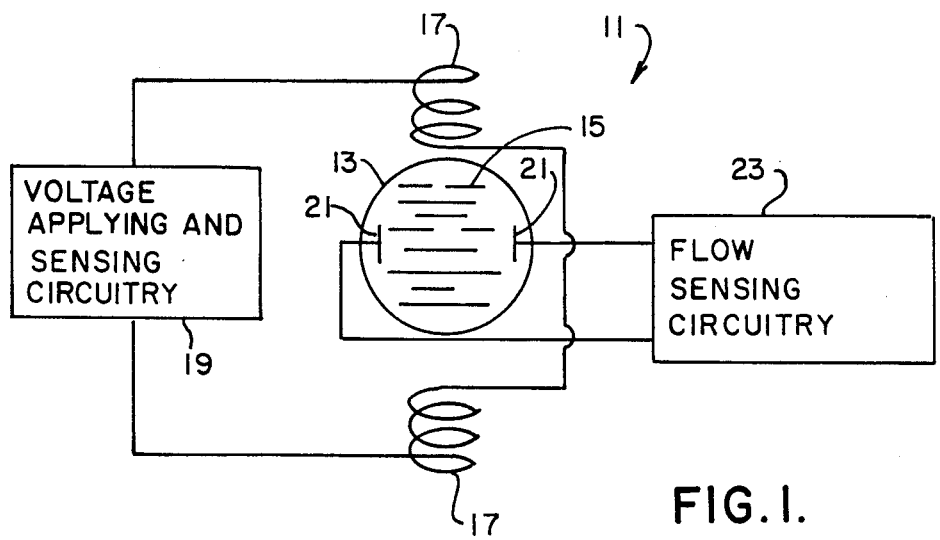
FIG. 1 is a schematic of a magnetic flowmeter of the present invention.

Magnetic flowmeter system 11 of the present invention includes a flowtube 13 adapted to be connected in a flow system for flow of liquid 15 therethrough. System 11 further includes electromagnetic coils 17 suitably disposed around tube 13 for generating a magnetic field in the path of the fluid flowing through the tube 13. Voltage applying and current sensing circuitry 19 is provided for applying a voltage waveform across coils 17 to generate the magnetic field, the strength and direction of the magnetic field being a function of the applied waveform. Oppositely disposed electrodes 21 disposed tranverse to the path of fluid 15 through tube 13 detect an induced voltage caused by the flow of the fluid through the magnetic field. The magnitude of the induced voltage is generally proportional to the rate of flow of the fluid. Electrodes 21 are connected to flow sensing circuitry 23 for suitably amplifying and displaying or recording the induced voltage signal representative of the rate of flow of the fluid.

Figure 2:
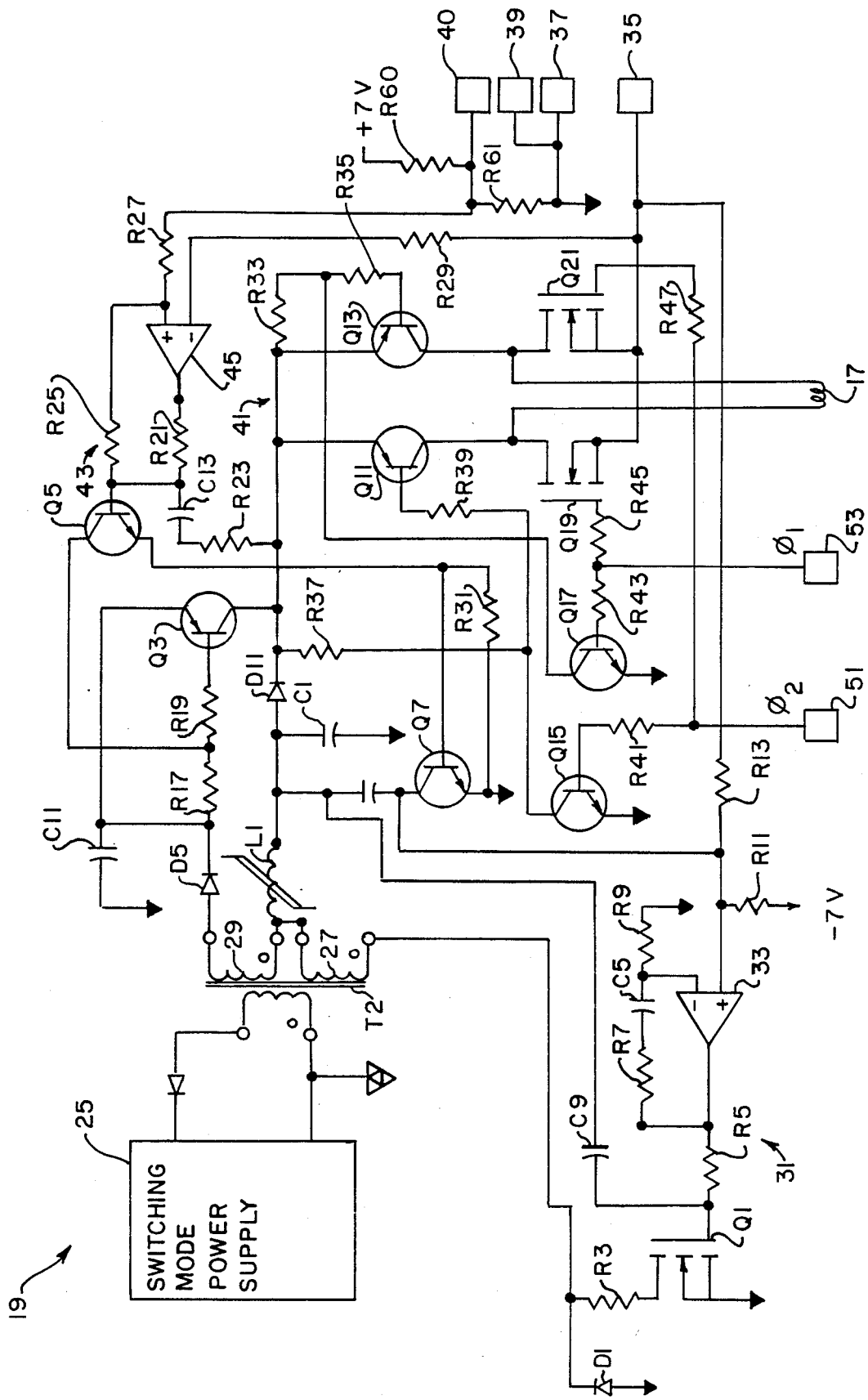
FIG. 2 is an electrical schematic of the coil driving circuitry of the present invention.
Figure 3:
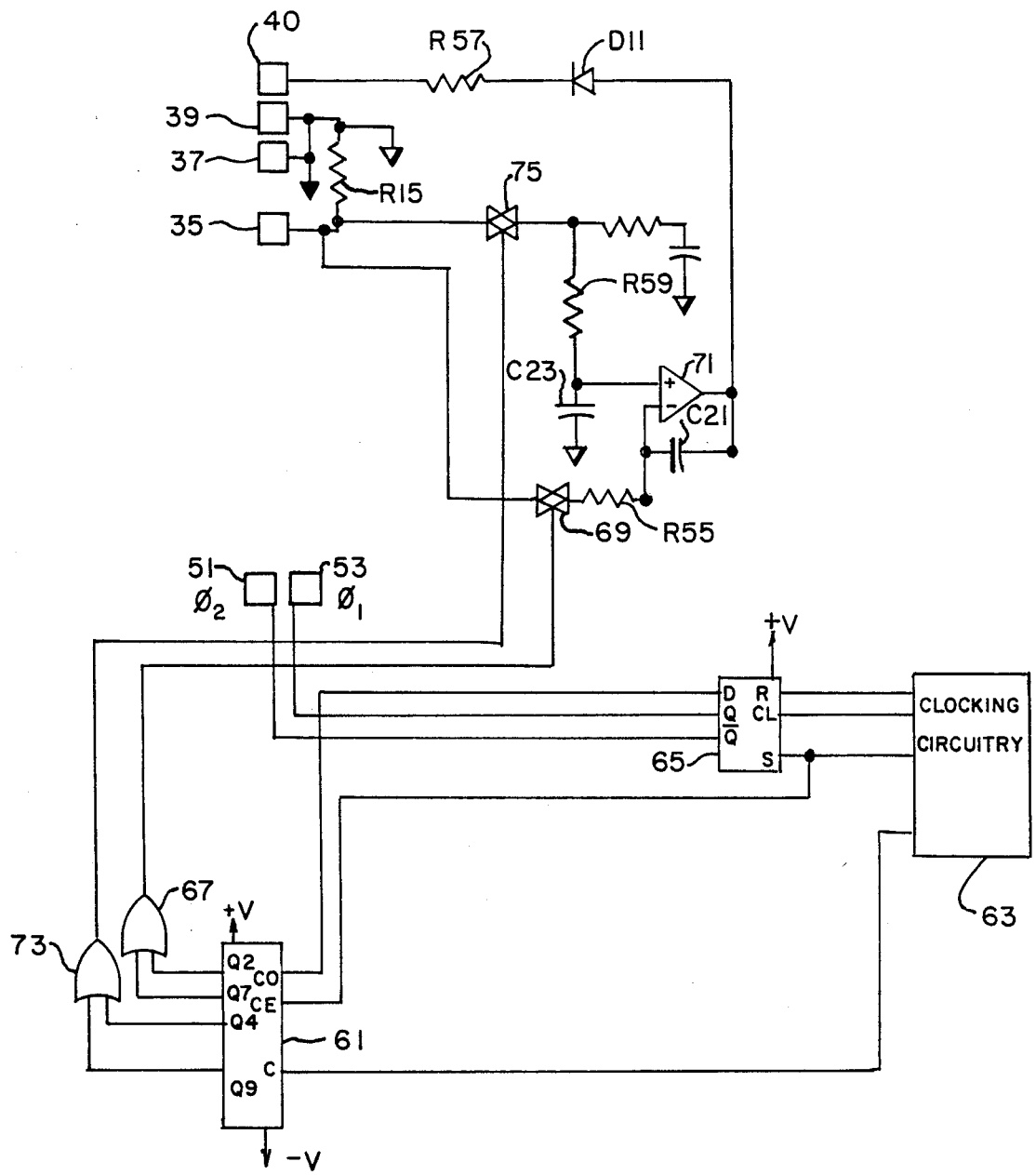
FIG. 3 is an electrical schematic of current slope detecting circuitry of the present invention.

Voltage applying and sensing circuitry 19 is shown in greater detail in FIGS. 2 and 3. Circuitry 19 includes a switching mode power supply 25 of conventional design connected to the primary winding as shown of a suitable transformer T2. Transformer T2 includes a pair of secondary windings 27 and 29. The number of turns of secondary winding 27 is selected so that a relatively low voltage of, for example, eight volts is made available for applying to coils 17. Similarly, secondary winding 29 includes a number of turns selected to provide a relatively high voltage such as, for example, twenty-six volts to winding coil 17. Secondary winding 29 is connected in series with secondary winding 27.

Secondary winding 27 is connected through a saturable reactor L1 (having a volt characteristic of 325 microvolt seconds, for example) to a 100 micro-F capacitor C1. The circuitry associated with this capacitor attempts to maintain a steady voltage on capacitor C1 of such a magnitude that the current through coil 17 is 0.5 amps. Saturable reactor L1 is made of a metal such as that sold under the trade designation Orthonol by Spang & Company of Butler, Pa., which has a square magnetic hystersis loop.

The terminal of secondary winding 27 opposite the terminal connected to saturable reactor L1 is connected through a diode D1 to power common. This terminal of secondary winding 27 is also connected through a 2K-ohm resistor R3 to an NMOS transistor Q1 connected as shown to resistor R3 and to power common. The control or gate terminal of transistor Q1 is connected to circuitry indicated at 31 for sensing the actual current through coil 17. Current sensing circuitry 31 includes an operational amplifier (op amp) 33 whose output is connected through a 1 M-ohm resistor R5 to the gate terminal of transistor Q1. A 47.5K-ohm resistor R7 and a 0.22 micro-F capacitor C5 are connected between the output of op amp 33 and its inverting input. The inverting input of the op amp is also connected by a 10K-ohm resistor R9 to power common. Resistor R5 is connected to one lead of a 0.1 micro-F capacitor C9 whose other lead is connected to saturable reactor L1 and capacitor C1. As will become apparent below, the voltage on capacitor C9 controls the amount of reset of saturable reactor L1.

The non-inverting input to op amp 33 is connected through a 140K-ohm resistor R11 to −7 volts and through a 10K-ohm resistor R13 to a terminal 35. As explained below, terminal 35 and a pair of terminals 37 and 39 are connected to a precision 1 ohm resistor 15 (FIG. 3) so that the voltage across terminals 35 and 37 directly represents the actual current flowing through coil 17.

Secondary winding 29, the relatively high voltage winding, is connected through a diode D5 to a 1000 micro-F capacitor C11 which stores the relatively high voltage of approximately twenty-six volts for application as needed to coil 17. Capacitor C11 is connected to the emitter of a pnp type resistor Q3 whose base is connected through a pair of 49.9 K-ohm resistors R17 and R19 to capacitor C11. The collector of transistor Q3 is connected to one node of the bridge circuit 41, described below, which controls the application of the high and low voltages to coils 17. The junction between resistors R17 and R19 is connected to the collector of an npn type transistor Q5, so that transistor Q5 controls the conduction of transistor Q3. The base of transistor Q5 is connected to a control circuit 43 which causes transistor Q5 to conduct when the level of coil current is lower than the boost signal, supplied from the circuitry of FIG. 3 at terminal 40 shown in FIG. 2. More particularly, circuitry 43 includes an operational amplifier 45 with positive feedback whose output is connected through a 4.99 K-ohm resistor R21 to the base of transistor Q5. The circuitry 43 requires a turn-on signal. Therefore, the base of transistor Q5 is also connected through a 0.001 micro-F capacitor C13 and a 10K-ohm resistor R23 to the previously referred to node of bridge circuit 41. Circuitry 43 also includes a 1 M-ohm resistor R25 connected between the base of transistor Q5 and the non-inverting input of op amp 45. The non-inverting input of the op amp is also connected through a 100K-ohm resistor R27 to terminal 40 from which it receives the boost signal. Also connected to terminal 40 is a voltage divider, made of a pair of resistors R60 and R61, which sets the minimum boost level. Resistor R60, a 68.1K-ohm resistor, is connected to +7 V and resistor R61, a 4.02K-ohm resistor, is connected to common. The inverting input of op amp 45 is connected through a 100K-ohm resistor R29 to terminal 35. The output of op amp 45 is a series of pulses, one each half cycle, which lasts for less than one-fifth of a cycle. The actual length of this pulse, as is shown below, is determined by the circuitry of FIG. 3, and the inductance of the coil 17.

Pulses from op amp 45 cause transistor Q5 to conduct during the pulse. The emitter of transistor Q5 is connected to the base of an npn-type transistor Q7 whose collector is connected to the non-inverting input of op amp 33 in the current sensing circuitry. The emitter of this transistor Q7 is connected to circuit common. In addition, a 100K-ohm resistor R31 is connected between the base and emitter of transistor Q7. When transistor Q5 conducts, transistor Q7 conducts as well, which draws the non-inverting terminal of op amp 33 to power common and hence inhibits the sensing of the coil current during the time in which the relatively high voltage of twenty-six volts is applied to the coils.

The collector of transistor Q5, being connected to the junction between resistors R17 and R19, forces transistor Q3 "on" when the former transistor conducts. This causes the voltage on capacitor C11 to be applied to the upper node of bridge circuit 41 at that time. Note that after transistor Q3 ceases conducting, the voltage on capacitor C1 (the relatively low (voltage) is supplied through a diode D11 to the upper node of bridge circuit 41 so that the relatively low voltage is thereupon applied to the bridge circuit upon the removal of the relatively high voltage.

Bridge circuit 41 includes a pair of pnp type transistors Q11 and Q13. The emitters of these two transistors are connected to the top node of the bridge circuit while their collectors are connected to opposite terminals of coil 17. As a result, coil 17 is connected directly across the bridge. The base terminals of transistors Q11 and Q13 are each connected to the top node of the bridge circuit through a pair of 4.99K-ohm resistors R33 and R35, and R37 and R39 respectively. Conduction of these two transistors is controlled by a pair of npn type transistors Q15 and Q17. The emitter of transistor Q15 is connected to power common while its collector is connected to the junction between resistors R37 and R39. The base of transistor Q15 is connected through a 68.1K-ohm resistor R41 to a terminal 51 upon which appears a polarity control signal phi-2. Similarly, the collector of transistor Q17 is connected to the junction between resistors R33 and R35 and its base is connected by a 68.1K-ohm resistor R43 to a terminal 53 on which appears a complementary polarity control signal phi-1. As described below, when signal phi-1 is low, signal phi-2 is high and vice versa. As a result, only one of transistors Q15 or Q17 conduct at any given time. When transistor Q15 conducts, this turns on transistor Q11 to cause current to flow through coil 17 in the direction from left to right as shown in FIG. 2. Similarly, when transistor Q17 conducts, this turns on transistor Q13 which causes current to flow through coil 17 in the direction from right to left as shown in FIG. 2.

Signal phi-1 is also supplied through a 301K-ohm resistor R45 to the gate terminal of an NMOS transistor Q19. Similarly, signal phi-2 is supplied through a 301K-ohm resistor R47 to the gate terminal of an NMOS transistor Q21. The source and drain terminals of transistors Q19 and Q21 form the other two sides of the bridge circuit. When signal phi-1 is high, transistor Q19 conducts, which allows the current flowing through transistor Q13 and coil 17 in the right to left direction to flow through transistor Q19 to terminal 35 and from there to the circuitry of FIG. 3. Similarly, when signal phi-2 is high, transistor Q21 conducts which allows the current flowing through transistor Q11 and through coil 17 in the left to right direction to flow through transistor 21 to terminal 35. With this bridge arrangement, it is therefore possible to reverse the polarity of the current flowing through coil 17 with a power supply of a single polarity.

No matter what the polarity of the current flow through coil 17, once the current flows through transistor Q19 or transistor Q21 as appropriate, the current flows through terminal 35, to and through resistor R15 (FIG. 3), and back through terminal 37 to power common. Resistor R15 is a precision 1 ohm resistor so that the voltage between power common and terminal 35 is equal to the current actually flowing through coil 17. The lead of resistor R15 connected to terminal 37 is also connected to system ground common.

The voltage across resistor R15 is measured not only for purposes of sensing the coil current as described above, but is also used to sample the coil current at predetermined times in the voltage application cycle to determine if the current during the latter part of the cycle is relatively constant. The circuitry of FIG. 3 in part determines whether or not the current is or is not relatively constant and in response varies the amount of time the relatively high voltage is applied to the coils in order to make the sampled current relatively constant.

More particularly, the circuitry of FIG. 3 includes a decade counter 61 having its clock and enable inputs connected to suitable clocking circuitry 63. The requirements for clocking circuitry 63 are relatively conventional and are not described herein. The circuitry merely supplies clock and enable pulses at predetermined rates. Decade counter 61 controls the length of the cycle during which voltage is applied to coil 17 and determines the times during that cycle in which the current through resistor R15 is sampled. A D-type flip flop 65 controlled by the decade counter has its complementary Q and Q-bar outputs connected to terminals 51 and 53 so that the Q output of flip flop 65 is the phi-1 control signal referred to above and the Q-bar output of the flip flop is the phi-2 output signal. These signals determine the beginning and ending of the application of voltage to the coil 17 in either direction. The D input of flip flop 65 is connected to the OUT pin, labelled CO, of decade counter 61. This particular pin of the decade counter is high for counts 0 through 4 and low for counts 5 through 9 of the counter. Thus, decade counter 61 divides the whole cycle of the waveform into two equal portions. The first portion corresponds to counts 0 through 4 of the decade counter and causes the phi-1 signal to be high and the phi-2 signal to be low. Similarly, during counts 5 through 9 of the decade counter, signal phi-1 is low and signal phi-2 is high.

In addition to determining the starting and stopping times of the voltage waveform cycle, decade counter 61 also controls when the current samples are taken to determine whether or not the current through the coil is relatively constant. The Q2 and Q7 outputs of decade counter 61 are supplied to an OR gate 67 whose output is connected to the control terminal of a bilateral switch 69. One side of bilateral switch 69 is connected to resistor R15 while the other side is connected through resistor R55 to the inverting input of operational amplifier 71. Resistor R55 is a 100K-ohm resistor connected with a 0.22 micro-F capacitor C21 between the output and the inverting input of an operational amplifier 71. With this arrangement, the voltage applied to the inverting input of op amp 71 is a function of the current sensed flowing through resistor R15 during counts 2 and 7 of the cycle.

Similarly, the Q4 and Q9 outputs of decade counter 61 are supplied to an OR gate 73 whose output is connected to the control terminal of a bilateral switch 55. One side of bilateral switch 75 is connected to resistor R15 while the other side is connected through a 100 K-ohm resistor R59 to the non-inverting input of op amp 71. The non-inverting input of the op amp is also connected through a 0.22 micro-F capacitor C23 to system common. Bilateral switch 75 samples the current through resistor R15 during counts 4 and 9 of the voltage waveform cycle. Op amp 71 as a result compares successive samples of the current flowing through resistor R15 to detect any differences in those samples. The output of op amp 71 represents the accumulation of these differences and provides the boost signal through diode D11 and resistor R57, a 68.1K-ohm resistor to terminal 40. Note that the samples of current are not taken during the first two counts of each half cycle. This is done so that current samples are not taken until after the application of the relatively high voltage to the coils.

Figure 4:
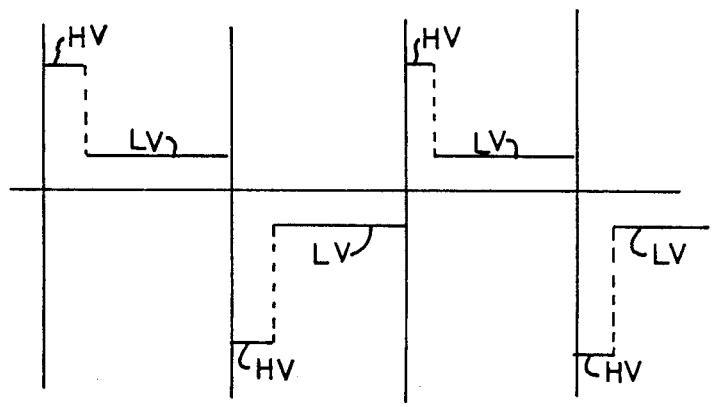
FIG. 4 illustrates the voltage waveform applied to the electromagnet coil of the flowmeter of the present invention.
Figure 5:
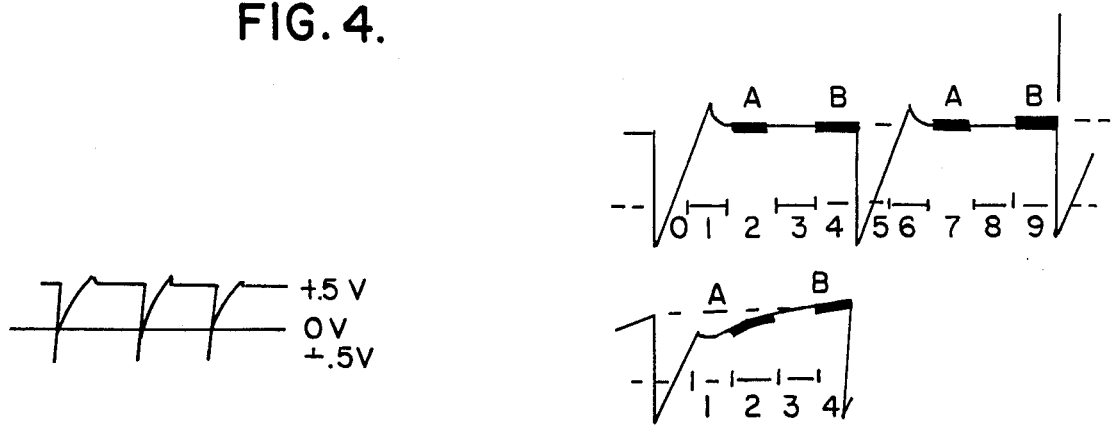
FIG. 5 is a diagram of the coil current resulting from the imposition of the voltage waveform of FIG. 4.
Figure 6:
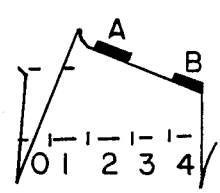
FIG. 6 is a diagram illustrating the operation of the slope detecting circuitry of FIG. 3.

The operation of the present system is more easily seen in connection with FIGS. 4, 5, and 6. The voltage waveform applied to coil 17 is shown in FIG. 4 to include for each half cycle a relatively high voltage portion HV and a relatively low voltage portion LV. Of course, for each half cycle, the polarity of these portions is reversed. During the high voltage portion of the waveform the current sensing circuitry 31 of FIG. 2 is disabled because of the conduction of transistors Q5 and Q7 as described above. Once the high voltage portion of the cycle is ended, the coil current is read by op amp 33 which is configured as an integrator. This integrator slowly changes the bias voltage into transistor Q1 and capacitor C9. In fact the voltage which develops across capacitor C9 establishes the drive voltage during the low voltage portion of the waveform.

Transformer T2 is charged magnetically during part of the switching cycle of switching mode power supply 25. During the second half of the switching cycle the charge stored in the transformer is released into the loads. This cyclic signal is used to drive saturable reactor L1 in and out of saturation. During operation, the current which flows through diode D1 is pumped into saturable reactor L1 causing it to saturate, at which time it has an impedance of less than 0.1 ohms. To regulate this current, a small reset current is allowed to flow in the opposite direction through transistor Q1 during the transformer charging part of the cycle. By using a MOSFET transistor such as Q1 as the control element, the charge on capacitor C9 determines the final output voltage. Since the saturation of saturable reactor L1 is a function of time as well as volts, the deeper the reactor is driven into reset the longer it takes before load current is allowed to flow once the cycle switches. During the high voltage part of the cycle as shown in FIG. 4, saturable reactor L1 is driven deep enough into reset so as to completely cut off the current. Of course, for cases of high coil resistance the reset current is reduced to zero and all available current is passed to the load. Thus, saturable reactor L1 acts as a magnetic amplifier to regulate the voltage supplied during the low voltage portion of the cycle to coils 17 to maintain the current at a predetermined point such as 0.5 amps.

Of course, as shown in FIG. 5 the coil current is constant only during the latter part of the cycles and not during the switching of the polarity of the current through the coil or during the time in which the relatively high voltage is applied across the coils. The current upon switching falls to approximately −0.5 amps and then rises rapidly due to the application of the relatively high voltage to just above 0.5 amps positive. At this point the relatively high voltage is removed and the relatively low voltage is applied through diode D11 to allow the current to reach its steady state value of 0.5 amps as shown in FIG. 5. The overdrive of the current shown in FIG. 5 is required to overcome eddy current losses in the flowmeter itself.

The length of time the relatively high voltage is applied is not a constant but rather is controlled by the circuitry of FIG. 3 as illustrated in FIG. 6. Line I of FIG. 6 illustrates the normal condition in which the sampled current during the relatively low voltage portion of the cycle is constant. This indicates that the length of time the relatively high voltage is applied is proper. The darkened sections of the curves shown in FIG. 6 illustrate the portions of the cycle during which the current samples are taken.

Op amp 71 is configured as an integrator. The coil current is sampled into both sides of the amplifier at different predetermined times in the coil reversal cycle. Each of the half coil cycles are divided into five clock periods as described above. During clock period "2" a sample labeled "A" is taken into the inverting side of op amp 71 whereas in count "4", a sample labeled "B" is taken into the non-inverting input of the op amp. Similarly, an "A" sample is taken into the inverting input of op amp 71 during count "7" and a "B" sample is taken into the non-inverting input of the op amp during count "9". When the values of consecutive "A" and "B" samples are the same, the integrator output holds its previous value since this indicates that the coil current is constant. However, if the "A" value is lower than the "B" value, as shown in line II of FIG. 6, this indicates that the high voltage portion of the waveform is not long enough. As a result, the output of the integrator increases, which increases the value of the boost signal on terminal 40. Similarly, if the "A" sample is larger than the "B" sample, as shown in line III of FIG. 6, this indicates that the high voltage is applied for too long a time and should be reduced. In this event, the output of the integrator is decreased which decreases the value of the boost signal on terminal 40.

Thus, it can be seen that the circuitry of FIG. 3 is used to keep consecutive samples of the current at a constant value and that the current sensing circuitry 31 of FIG. 2 is used to insure that this constant value is the desired predetermined value of 0.5 amps. In other words, the circuitry of FIG. 3 insures that the slope of the current during the low voltage portion of the cycle is relatively flat and the current sensing circuitry 31 of FIG. 2 determines the actual level of that current.

In view of the above it will be seen that the various objects and features of the present invention are achieved and other advantageous results obtained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. In a magnetic flowmeter comprising a body adapted to be connected in a flow system for flow of liquid therethrough, coil means for generating a magnetic field in the path of the fluid flowing through the body, voltage means for applying a voltage waveform across the coil means to generate the magnetic field, the strength and direction of the magnetic field being a function of the applied voltage waveform, said voltage means including means for periodically reversing the polarity of the voltage applied across the coil means to reverse the direction of the magnetic field, electrode means disposed transverse to the path of the fluid for detecting an induced voltage caused by the flow of the fluid through the magnetic field, the magnitude of the induced voltage being generally proportional to the rate of flow of said fluid, the improvement comprising:

the voltage means including means for applying a first, relatively high voltage across the coil means for a controlled length of time to build the coil current to a desired level and means for applying a second, relatively low voltage across the coil means after the application of the high voltage to maintain the coil current at the desired level, so that the voltage waveform includes for each cycle half a relatively high voltage portion and a relatively low voltage portion;

means for sampling coil current; and means responsive to differences in consecutive coil current samples for substantially eliminating such differences in subsequent coil current samples by changing the length of time the relatively high voltage is applied across the coil means.

2. The magnetic flowmeter as set forth in claim 1 wherein the sampling means includes means for dividing the voltage waveform into a predetermined number of clock periods per cycle, said coil current samples being taken during specified clock periods during each cycle.

3. The magnetic flowmeter as set forth in claim 1 wherein the difference eliminating means includes means for integrating successive differences between consecutive coil current samples and generating a signal proportional thereto, the length of time the relatively high voltage is applied across the coil means being a function of the integrated difference signal.

4. The magnetic flowmeter as set forth in claim 1 wherein the coil current samples are taken during the portion of the cycle when the relatively low voltage is applied across the coil means, said difference eliminating means including a slope detector for detecting changes in the value of consecutive coil current samples.

5. The magnetic flowmeter as set forth in claim 1 wherein the sampling means includes means for comparing the values of consecutive coil current samples and for integrating any differences resulting from that comparison.

6. The magnetic flowmeter as set forth in claim 1 wherein the difference eliminating means includes means for increasing the length of time the relatively high voltage is applied across the coil means when the values of consecutive coil current samples increase and for decreasing the length of time the relatively high voltage is applied across the coil means when the values of consecutive coil current samples decrease.

7. The magnetic flowmeter as set forth in claim 1 further including means for regulating the current flowing through the coil means during the portion of the cycle after the relatively high voltage is removed, said regulating means including means for sensing the current flowing through the coil means, and means for inhibiting the sensing means during the application of the relatively high voltage to the coil means.

8. The magnetic flowmeter as set forth in claim 7 wherein the regulating means includes a saturable reactor connected to the low voltage applying means for controlling the voltage applied by the low voltage applying means, the saturable reactor being responsive to the actual current sensed by the current sensing means.

9. The magnetic flowmeter as set forth in claim 8 further including means connected to the current sensing means for resetting the saturable reactor, the degree of resetting being a function of the sensed current.

10. The magnetic flowmeter as set forth in claim 8 wherein the saturable reactor is in series with a transistor which controls the reset current through the reactor flow through said transistor being a function of the coil means current sensed by the sensing means.

11. The magnetic flowmeter as set forth in claim 1 wherein the high voltage applying means includes a source of the relatively high voltage and a gating transistor connected between the high voltage source and the coil means, said gating transistor having a control terminal connected to the difference eliminating means.

12. The magnetic flowmeter as set forth in claim 1 wherein the polarity reversing means includes a source of first and second complementary control signal waveforms, a first transistor having a control terminal to which the first control waveform is applied, the load current terminals of the first transistor being connected between a first side of the coil means and ground, a second transistor having a control terminal to which the second control waveform is applied, the load current terminals of the second transistor being connected between a second, opposite side of the coil means and ground, a third transistor having its load current terminals connected between a power source and the second side of the coil means, and a fourth transistor having its load current terminals connected between the power source and the first side of coil means.

13. The magnetic flowmeter as set forth in claim 1 wherein the polarity reversing means includes four electronic switching elements, each having a pair of load current terminals and a control terminal for controlling the flow of current between its associated load current terminals, the load current terminals of the switching elements being connected in a bridge configuration with the coil means connected across two, opposite nodes of the bridge, the other two nodes of the bridge being connected to a single polarity voltage source and to a circuit common respectively.

14. The magnetic flowmeter as set forth in claim 13 wherein the polarity reversing means further includes a source of first and second complementary control signals, the first control signal being supplied to the control terminals of two of the switching elements on opposite sides of the bridge, and the second control signal being supplied to the control terminals of the two other switching elements.

15. The magnetic flowmeter as set forth in claim 13 wherein the load current terminals of two of the switching elements are connected between the coil means and a current sensing resistor, said two switching elements being MOSFET-type transistors.

16. A method of driving the coils in a magnetic flowmeter having a body adapted to be connected in a flow system for flow of liquid therethrough and coils for generating a magnetic field in the path of the fluid flowing through the body, the method comprising:

cyclically applying a relatively high voltage and a relatively low voltage across the coils;

sensing the current through the coils during a portion of the cycle when only the relatively low voltage is being applied across the coils;

increasing the length of time the relatively high voltage is applied during subsequent cycles when the current sensed during the time the relatively low voltage is applied across the coils rises slightly during the time said relatively low voltage is applied; and decreasing the length of time the relatively high voltage is applied during subsequent cycles when the current sensed during the time the relatively low voltage is applied across the coils falls slightly during the time said relatively low voltage is applied.

17. The method as set forth in claim 16 further including the step of cyclically reversing the polarity of the applied current so that current flows in a first direction through the coils during one cycle portion and in the opposite direction through the coils the next cycle portion.

18. The method as set forth in claim 16 further including the step of regulating the level of current flowing through the coils during the application of the relatively low voltage.

19. The method as set forth in claim 16 wherein the current sensing step includes sampling the coil current at least twice during each application of relatively low voltage.

20. The method as set forth in claim 19 further including the step of substantially continuously sensing the coil current during the application of relatively low voltage and regulating the level of coil current in response to the continuously sensed values thereof.

21. The method as set forth in claim 20 wherein the coil current regulating step includes the step of resetting a saturable reactor through which coil current flows, the amount of reset being determined by the coil current during the low voltage application portion of the cycle.

22. The method as set forth in claim 16 wherein the application of the relatively low voltage occurs after the application of the relatively high voltage.

23. The method as set forth in claim 16 wherein the current sensing step includes dividing the cycle into a predetermined number of clock periods and sensing the coil current during specified clock periods during each cycle.

24. In a magnetic flowmeter comprising a body adapted to be connected in a flow system for flow of liquid therethrough, coil means for generating a magnetic field in the path of the fluid flowing through the body, voltage means for applying a voltage waveform across the coil means to generate the magnetic field, the strength and direction of the magnetic field being a function of the applied voltage waveform, electrode means disposed transverse to the path of the fluid for detecting an induced voltage caused by the flow of the fluid through the magnetic field, the magnitude of the induced voltage being generally proportional to the rate of flow of the fluid, the improvement comprising:

the voltage means including means for applying a first, relatively high voltage across the coil means for a controlled length of time to build the coil current to a desired level and means for applying a second, relatively low voltage across the coil means after the application of the high voltage to maintain the coil current at the desired level so that the voltage waveform includes a relatively high voltage portion and a relatively low voltage portion for each cycle;

means for sensing coil current; and means for regulating the coil current during the low voltage portion of each cycle, said regulating means including a saturable reactor connected to the low voltage applying means for controlling the voltage applied by the low voltage applying means, the saturable reactor being responsive to the current sensed by the current sensing means.

25. The magnetic flowmeter as set forth in claim 24 wherein the regulating means includes means for inhibiting the sensing means during the application of the relatively high voltage to the coil means.

26. The magnetic flowmeter as set forth in claim 24 further including means connected to the current sensing means for resetting the saturable reactor, the degree of resetting being a function of the sensed current.

27. The magnetic flowmeter as set forth in claim 26 wherein the saturable reactor is in series with a transistor which controls the reset current through the reactor, the current flow through said transistor being a function of the coil means current sensed by the sensing means.

28. In a magnetic flowmeter comprising a body adapted to be connected in a flow system for flow of liquid therethrough, coil means for generating a magnetic field in the path of the fluid flowing through the body, voltage means for applying a voltage waveform across the coil means to generate the magnetic field, said voltage means including means for applying a first, relatively high voltage across the coil means to build the coil current to a desired level and low voltage applying means for applying a second, relatively low voltage across the coil means after the application of the high voltage to maintain the coil current at the desired level, so that the voltage waveform includes for each cycle half a relatively high voltage portion and a relatively low voltage portion, the strength and direction of the magnetic field being a function of the applied voltage waveform, said voltage means including means for periodically reversing the polarity of the voltage applied across the coil means to reverse the direction of the magnetic field, electrode means disposed transverse to the path of the fluid for detecting an induced voltage caused by the flow of the fluid through the magnetic field, the magnitude of the induced voltage being generally proportional to the rate of flow of the fluid, the improvement comprising:

the polarity reversing means including four electronic switching elements, each having a pair of load current terminals and a control terminal for controlling the flow of current between its associated load current terminals, the load current terminals of the switching elements being connected in a bridge configuration with the coil means connected across two, opposite nodes of the bridge and the other two nodes of the bridge being connected to a single polarity voltage source and to a circuit common respectively; and means for regulating the current flowing through the coil means during the relatively low voltage portion of the cycle, said regulating means including a saturable reactor connected to the low voltage applying means for controlling the voltage applied by the low voltage applying means.

29. The magnetic flowmeter as set forth in claim 28 wherein the regulating means includes means for sensing the current flowing through the coil means, the saturable reactor being responsive to the actual current sensed by the current sensing means.

30. The magnetic flowmeter as set forth in claim 29 wherein the regulating means includes means for inhibiting the sensing means during the application of the relatively high voltage to the coil means.

31. The magnetic flowmeter as set forth in claim 28 wherein the saturable reactor is in series with a transistor which controls the reset current through the reactor, the current flow through the transistor being a function of the current through the coil means.

* * * * *